April 28, 1942.  A. E. MATHEY  2,281,448
DEVICE FOR PARTIALLY OBSTRUCTING A PIPE
Filed Sept. 17, 1941  2 Sheets-Sheet 2
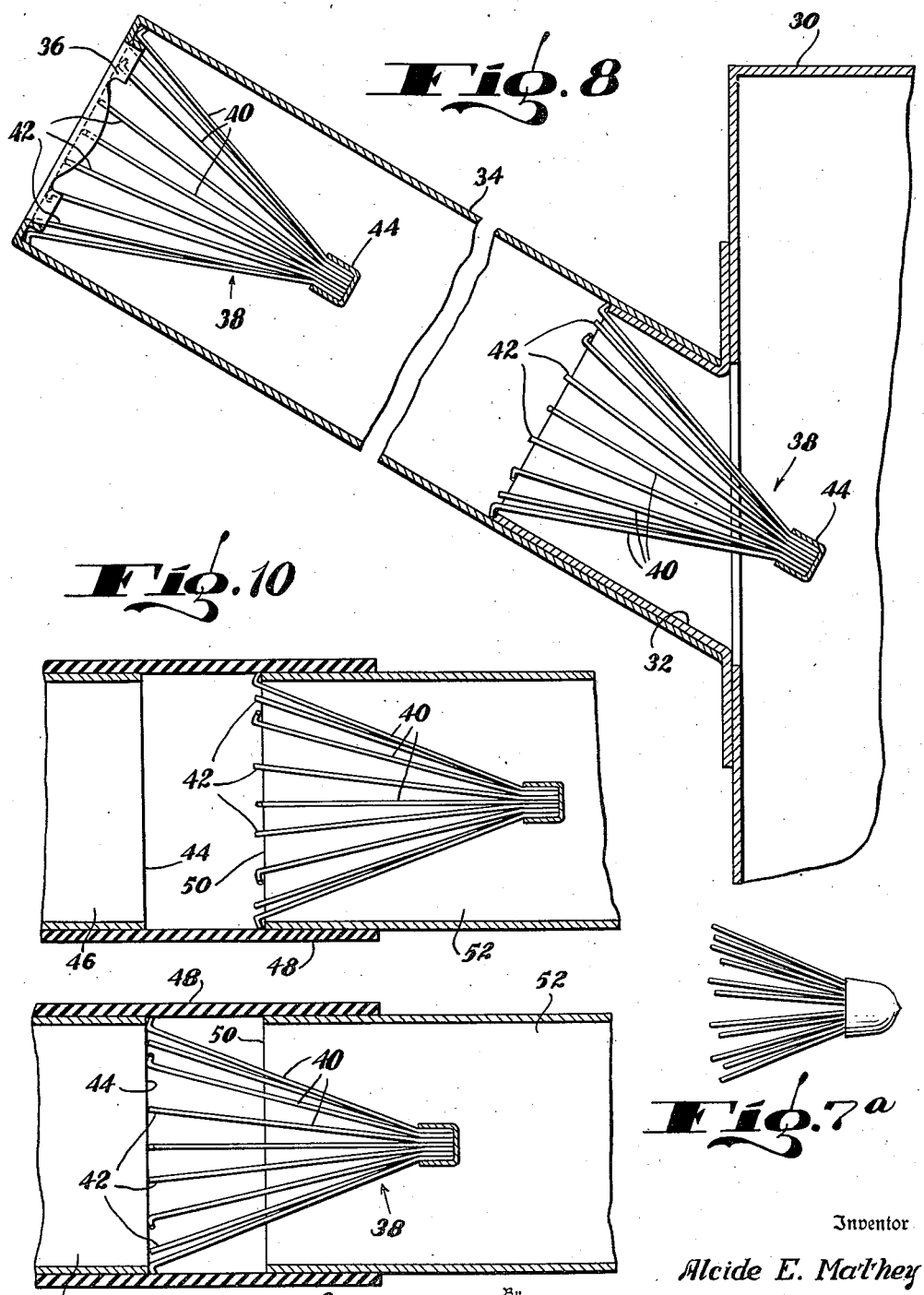
Inventor
Alcide E. Mathey
C. Yardley Chittick
Attorney Patented Apr. 28, 1942

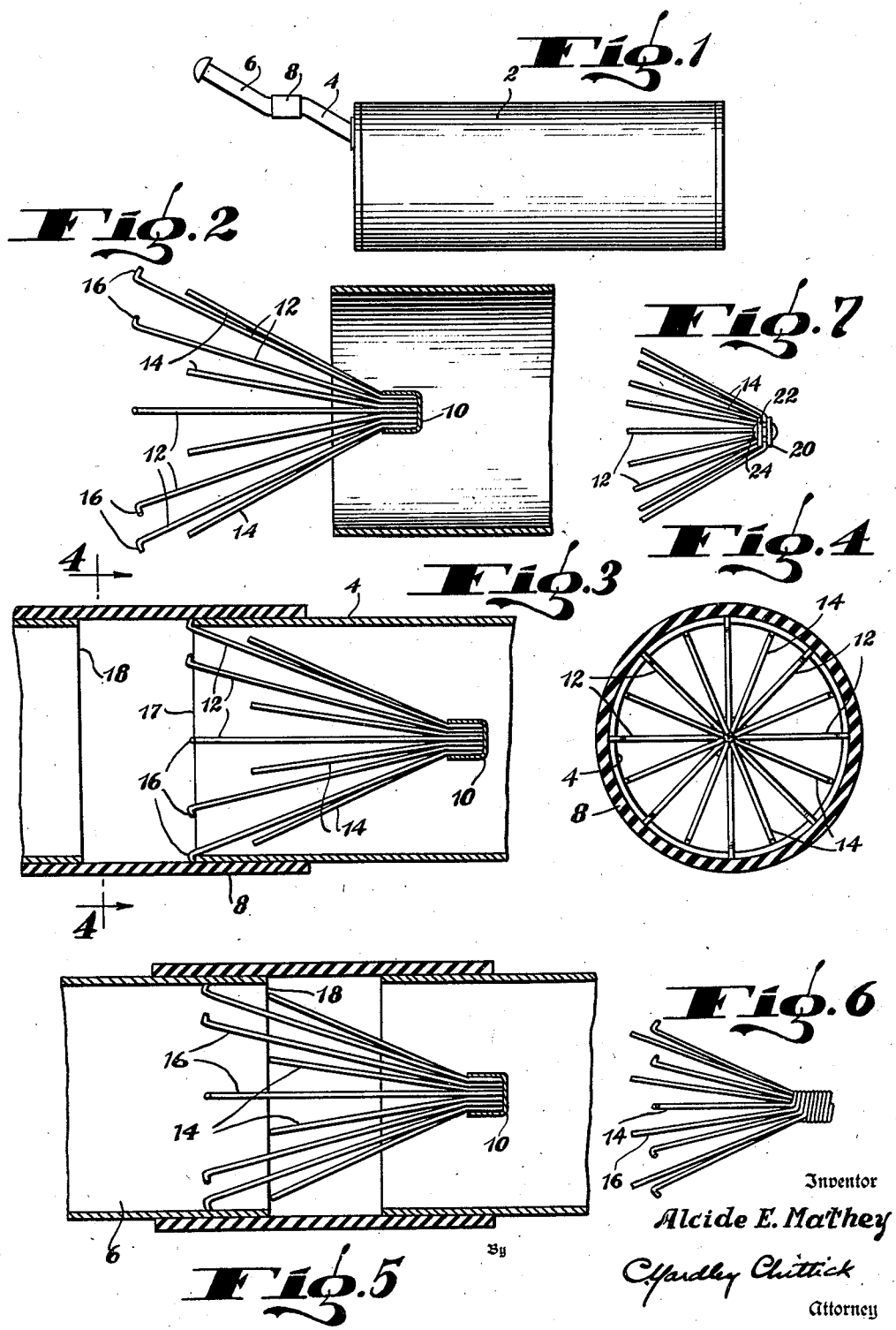

2,281,448

UNITED STATES PATENT OFFICE 2,281,448

DEVICE FOR PARTIALLY OBSTRUCTING PIPES

Alcide E. Mathey, Boston, Mass., assignor to Scully Signal Co., East Cambridge, Mass., a corporation of Massachusetts Application September 17, 1941, Serial No. 411,164

9 Claims. (Cl. 220—86)

This invention relates to means for partially obstructing a pipe. The particular object in view is the provision of a device constructed in such manner that it may be inserted in the fill pipe of a gasoline tank, and then, when in position, permitting the entrance of gasoline into the tank and escape of gas therefrom, but at the same time prohibiting the admission into the tank of a tube of such size as would normally be used if it were desired to siphon gasoline from the tank.

A further object of the invention is to provide means in connection with the device which will substantially prohibit its removal from the pipe after proper insertion thereinto so that a person attempting to insert a siphon tube through the filler pipe and finding it blocked by the present invention would not be able to effect the removal of the obstruction without considerable difficulty, plus the likelihood of causing damage to the fill pipe.

The device is capable of use with practically all automobile gasoline tanks as they now exist, in that the typical gasoline tank is made with a filler neck or pipe of two pieces, the parts being connected together by a short piece of flexible rubber hose. The invention makes use of this condition in effecting the locking of the device within the filler neck at the point of connection of the pipes.

These and other objects of the invention will become more apparent as the description proceeds with the aid of the accompanying drawings, in which:

Fig. 1 shows a fuel tank having a typical filler neck extending therefrom.

Fig. 2 shows the relationship of the obstructing device and the end of the fill pipe prior to insertion therein.

Fig. 3 shows the obstructing device located in locked position within the fill pipe.

Fig. 4 is a section on the line 4—4 of Fig. 3.

Fig. 5 shows the obstructing device as locked in position upon attempted removal from the fill pipe.

Fig. 6 shows an alternative method of connecting the ends of the device together.

Fig. 7 shows a further modification of the connecting means.

Fig. 7a shows a further modification of the connecting means.

Fig. 8 shows the use of the device in connection with a single-piece fill pipe.

Fig. 9 shows the device, in which all of the members are the same length, in position within a two-piece fill pipe.

Fig. 10 is similar to Fig. 9, with the device moved as far as it will go toward the tank.

Referring to Fig. 1, the tank 2 has extending therefrom a fill pipe which consists of an inner pipe 4, an outer pipe 6 and a flexible hose connection 8. This represents the typical construction of practically all of the gasoline tanks now in use on passenger cars.

In order to prevent removal of gasoline from tanks by siphoning, the obstructing device shown in Figs. 2, 3, 4 and 5 has been devised. The preferred form comprises a plurality of rodlike members which may be of relatively stiff and strong wire, the ends of which are collected and secured in any convenient manner. In Figs. 2, 3 and 4 the ends are shown as being inserted in a cup 10 which may be tightly crimped or squeezed so that the wires will be securely held in place.

The wires 12 and 14, of two different lengths, are arranged in a generally conical formation. The bases of the two cones thus formed by the wires 12 and 14 are of greater diameter than the inside diameter of the pipe with which the unit is to be used. That is to say, in order to insert the device into the pipe, the wires 12 and 14 must be circumferentially compressed so as to fit within the pipe. The base ends of wires 12 are bent outwardly to form hooklike portions, while the base ends of wires 14 are straight as shown. When the unit has been pushed down the pipe far enough to come to the point of the hose connection, the compressed wires will spring radially outward into the greater inside diameter of the hose and thereby lock the unit in place.

Locking of the unit against further movement toward the tank is accomplished by the engagement of the hooklike portions 16 with the outer end 17 of pipe 4, as can be plainly seen in Fig. 3.

The unit also provides a construction which, after proper insertion, precludes removal from the tank. If an attempt is made to draw the unit upwardly through the pipe from the position shown in Fig. 3, the hook ends 16 of wires 12 will first encounter the inner end 18 of pipe 4. Possibly from the angularity of hooklike portions 16 they might be compressed sufficiently toward the center to spring within the end of pipe 6 so that further outward movement of the unit could take place. However, as soon as the unit is moved outward far enough, members 14 reach the enlarged area at the hose connection, and, because they are under inward compression, they then spring radially to come into engagement with hose 8, and, as outward movement continues, finally into engagement with the end 18 of pipe 6, as shown in Fig. 5. Further outward movement of the unit is thus precluded. It becomes apparent, therefore, that the obstructing unit, once properly placed within the confines of the pipe and the hose connection, will be automatically locked in position so that it can neither be pushed into the tank nor withdrawn from the pipe.

Ordinarily the position of the hose connection with regard to the total length of the filler pipe is far enough from the outer end so that no mechanical means such as pliers or cutters could be inserted into the pipe to reach the obstructing unit. That is to say, the unit, unless destroyed by superior force, cannot be removed without the use of special equipment designed for the purpose, and it therefore constitutes effective protection against an attempt at surreptitious removal of liquid from the tank.

Wires 12 and 14 in the preferred construction are alternated so as to provide substantially uniform spaces therebetween, as can be seen in Fig. 4. The number of wires may, of course, be varied at will, depending upon the size of the siphon tube or other instrumentality it is desired to keep from admission to the tank.

The means for connecting the wires 12 and 14 together at the apex may be varied as seems expedient. One modification is shown in Fig. 6, in which the wires are all twisted together in a manner well known.

A further modification is shown in Fig. 7, in which the ends of the wires are clamped in position by a pair of disks 20, 22, which may be secured by a rivet 24. If mechanical crimping or securing means such as cup 10 is used in mounting the members in position, it might be desirable for greater security to introduce a quantity of molten metal within the cup, which will seal the interstices between the ends of the wires and thus provide a better grip. A further method of securing the ends of the wires as shown in Fig. 7a might be to embed them directly in settable material such as rubber or molten metal, which on hardening would give the necessary support.

In the construction shown in Figs. 2 to 5, certain of the members have been made shorter than others, as this construction tends to hold the unit firmly in place, as it is thereby supported at two different positions along the length of the pipe. However, it should be understood that it is not essential to the operativeness of the unit that the members be of different lengths, nor is it essential that the hooklike members be on the long wires as shown in Figs. 2 to 5. Instead, the hooklike members may be the shorter wires, as in Fig. 6, or they may be of the same length as the straightaway wires, as in Figs. 8, 9 and 10.

Accordingly, there is shown in Figs. 7a, 8, 9 and 10 the use of an alternative construction in which the fingerlike members are substantially the same length. In Fig. 8 the device is shown in use with a one-piece fill pipe, while in Figs. 9 and 10 it is shown in use with a two-piece fill pipe the same as that illustrated in Figs. 3, 4 and 5.

In Fig. 8 the taank 30 customarily has a short flange 32 extending therefrom over which is set fill pipe 34. As is usual in all gasoline tank fill pipes, the outer end terminates in an inwardly turned flange 36 which is adapted to receive the filler cap in the usual manner.

The obstructing device indicated generally at 38 in Fig. 8 is made in the same manner as those forms already described, except that the members 40 which have the hook-like formations on their ends are substantially the same length as members 42 which terminate straightway. The members 40 and 42 are connected at their ends at 44 in the same manner as heretofore described.

After the unit 38 has been inserted in the fill pipe 34, it is obvious that members 40 and 42 will spring outwardly to engage the inner circumference of the pipe, and if any attempt is made to withdraw the device, it will be found that this cannot be done, because the ends of members 40 and 42 will slide into position behind flange 36. Hence it will be seen that, once inserted, removal is difficult.

If, on the other hand, the unit 38 is pushed downwardly in an attempt to drive it into the tank, the members 40 with the hooklike formations on their base ends will engage the end of tank flange 32, which will, of course, stop further movement of the device into the tank.

Therefore, it can be seen that, once the device is in position in a single-piece fill pipe, it will be able to prevent the admission into the tank of a siphon tube or other instrument even though it is possible to vary the position of the unit along the length of the fill pipe.

In Figs. 9 and 10, the unit 38, in which the members 40 and 42 are the same length, is shown in use with a two-piece fill pipe. Fig. 9 illustrates the situation that prevails when an attempt is made to withdraw unit 38. The ends of members 40 and 42 come into engagement with the inner end 44 of pipe 46. Since the radial spring of the members is sufficient to hold them against coupling 48, and consequently continuously against end 44 of pipe 46, further outward movement of the device will be prevented.

If, on the other hand, an attempt is made to drive the unit into the tank, the situation shown in Fig. 10 will prevail. Here the hooklike formations on the ends of members 40 will engage the end 50 of pipe 52, thus preventing any further movement toward the tank.

Thus it can be seen that the construction in question permits the insertion of the device into a two-piece or a one-piece fill pipe and thereafter prohibits the removal of the device from the pipe or the forcing of the device downwardly into the tank. In this way, the fill pipe is continuously obstructed to the extent desired. The fingerlike members may be of varied lengths, as shown in Figs. 2 to 5, or may be of a single length, as in Figs. 8 to 10. Furthermore, all of the members may have their ends bent in hooklike formation, as this form will be sufficient to make effectual engagement with the inner end of the outer pipe in the two-piece pipe construction or with the outer end flange in the one-piece pipe construction. If all of the members have the hooklike formations, even greater security will be provided against the forcing of the unit into the tank.

The material of which the wires or members are made should be such that they may be able collectively to withstand substantial force exerted downwardly against the unit without having the hooklike portions bend away from the pipe or flange with which they may be in engagement, and conversely, they must be sufficiently rigid so that they will not buckle under such force as might be normally applied in an attempt at removal. Furthermore, the members must be of good elastic quality so as to snap firmly into place after insertion into the fill pipe.

While a preferred form of the invention has been disclosed, I wish it to be understood that I do not intende to be limited thereby, but only by the appended claims.

What is claimed is:

1. A device for partially obstructing a pipe, comprising three or more wire members, means for rigidly anchoring said members at an apex so that the members extend in a generally conelike formation, the said anchoring means being of relatively small cross-sectional dimension with respect to the cross-sectional dimension of the base of the conelike formation, the wire members being free at their outer ends and capable of being flexed from their normal position, the free ends of at least some of said wire members being bent radially outwardly to form hooklike engaging means, the projected area of the anchoring means and the wire members in the direction of the longitudinal axis of said device being less than three-quarters of the cross-sectional area as defined by the ends of said wire members.

2. A device for partially obstructing a pipe, comprising three or more wires, said wires embedded at an apex in a mass of settable material and extending in a generally conelike formation, the mass of settable material being the sole connecting means for said wires and being of relatively small cross-sectional dimension with respect to the cross-sectional dimension of the base of the conelike formation, said wires being free at their outer ends and capable of being flexed from their normal position, the free ends of at least some of said wires being bent radially outwardly to form hooklike engaging means, said wires being in spaced relationship and acting to obstruct the passage of solids that may be larger than a predetermined size, but permitting the substantially straight line passage of fluid in the direction of the longitudinal axis of the device.

3. A device for partially obstructing a pipe, comprising three or more wire members extending from an apex in a generally conelike formation and unconnected at their base ends, means for rigidly anchoring said members together at their apex thereby securing and maintaining said members in said formation, said members being resilient and capable of inward springlike action at their base ends, the base ends of said members being free and at least some of said free ends being bent radially outwardly to form hooklike engaging means, the base of the cone formed by the members being of a diameter substantially greater than the diameter the said base ends will assume when being used to obstruct a pipe, whereby adequate outward radial pressure will be exerted by said members when the device is in use.

4. In combination, a pipe and a device fitting within said pipe for partially obstructing the passage therethrough, said device comprising three or more wire members, said members fanning out from a common anchorage in a generally conelike formation, the cross-sectional dimension of the common anchorage being relatively small with respect to the cross-sectional dimension of the pipe, the wire members being free at their outer ends and capable of being flexed from their normal position, the free ends of at least some of said members being bent radially outwardly to form hooklike engaging means, the said members exercising an outward pressure against the pipe, and means connected to said pipe projecting inwardly on one side of said device for engaging the free ends of said members upon attempted removal of said device from said pipe.

5. In combination, a pipe and a device fitting within said pipe for partially obstructing the passage therethrough, said device comprising three or more wire members extending from a common anchorage in a generally conelike formation, the said anchorage being the sole connecting means for said members and the cross-sectional dimension of said anchorage being relatively small with respect to the cross-sectional dimension of the pipe, said members being resilient and capable of inward springlike action at their base ends, the base ends of said members being free and at least some of said free ends being bent radially outwardly to form hooklike engaging means, said wire members being in spaced relationship and acting to obstruct the passage of solids that may be larger than a predetermined size, but permitting the substantially straight line passage of fluid in the direction of the longitudinal axis of the device, said pipe having an inwardly turned flange at a position outwardly of said device and said pipe being of such configuration inwardly of said device that the engagement of the members with said inwardly turned flange will prevent outward movement of said device and engagement with said configuration will prevent movement of said device inwardly.

6. In combination, a pipe with an inwardly turned flange at its outer end, and a device fitting within said pipe for partially obstructing the passage therethrough, said device comprising three or more wire members extending from a common anchorage in a generally conelike formation, the said anchorage being the sole connecting means for said members and the cross-sectional dimension of the anchorage being relatively small with respect to the cross-sectional dimension of the pipe, the ends of said members at the base of said conelike formation being free and at least some of said ends being bent radially outwardly to form hooklike engaging means, said members being in spaced relationship and acting to obstruct the passage of solids that may be larger than a predetermined size, but permitting the substantially straight line passage of fluid in the direction of the longitudinal axis of the device, said members being forcibly flexed inwardly by said pipe, but capable of further inward flexing within the elastic limit of said members for initial insertion into said pipe past said flange.

7. In combination, two pipes end to end and connected together in spaced relation by a flexible tubular coupling, a device fitting within said pipes and coupling for partially obstructing the passage therethrough and irremovable therefrom, said device comprising a plurality of members arranged in generally conical formation and having means firmly holding the apex ends of said members whereby the latter will be maintained in said conical formation, certain of said members having on their base ends outwardly extending elements integral therewith forming engaging means, the apex of said device being within one of said pipes and the outwardly extending elements of said members being within the space between said pipes and in engagement with said tubular coupling, the said members exercising an outward pressure sufficient to maintain said outwardly extending elements in position between said pipes against any normal longitudinal force that might be exerted against said device.

8. In combination, two pipes end to end and connected together in spaced relation by a flexible tubular coupling, a device fitting within said pipes and coupling for partially obstructng the passage therethrough and irremovable therefrom, said device comprising a plurality of fingerlike members extending from a central position in a generally conelike formation, means for securing and maintaining said members in said formation, said members being resilient and capable of inward springlike action at their base ends, the ends of certain of said members being in expanded position between the ends of said pipes and against said tubular coupling.

9. In combination, a pipe and a device fitting within said pipe for partially obstructing the passage therethrough, said pipe having an inwardly turned flange at its outer end and an inwardly circumferentially extending projection at its other end, said device positioned between said flange and projection and comprising a plurality of fingerlike members extending from a central position in a generally conelike formation, means for securing and maintaining said members in said formation, said members being resilient and capable of inward springlike action at their base ends, the ends of certain of said members having outwardly extending elements integral therewith forming engaging means, the construction being such that when said device is moved toward the outer end of said pipe said members will engage said flange and when the device is moved toward the inner end of said pipe said outwardly extending elements will engage said inwardly extending projection.

ALCIDE E. MATHEY.